(12) United States Patent
Yamanaka et al.

(10) Patent No.: US 11,792,529 B2
(45) Date of Patent: Oct. 17, 2023

(54) IMAGING APPARATUS, METHOD OF DRIVING IMAGING APPARATUS, IMAGING SYSTEM AND MOBILE BODY

(71) Applicant: CANON KABUSHIKI KAISHA, Tokyo (JP)

(72) Inventors: Shinji Yamanaka, Tokyo (JP); Satoshi Omodani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/468,786

(22) Filed: Sep. 8, 2021

(65) Prior Publication Data
US 2022/0078326 A1  Mar. 10, 2022

(30) Foreign Application Priority Data
Sep. 10, 2020 (JP) ................ 2020-152281

(51) Int. Cl.
*H04N 23/73* (2023.01)
*H04N 23/745* (2023.01)

(52) U.S. Cl.
CPC ........... *H04N 23/73* (2023.01); *H04N 23/745* (2023.01)

(58) Field of Classification Search
CPC .... H04N 5/2353; H04N 5/2357; H04N 5/232; H04N 5/37452; H04N 23/73; H04N 23/745; H04N 25/771; H04N 23/60
See application file for complete search history.

(56) References Cited

U.S. PATENT DOCUMENTS 9,473,706 B2 * 10/2016 Malone .............. H04N 5/3696
2014/0340721 A1 * 11/2014 Kao ................... H04N 1/40056
358/475
2020/0314369 A1  10/2020 Yamanaka et al.

FOREIGN PATENT DOCUMENTS

| JP | 2005-101793 A | 4/2005 |
| JP | 2010-098416 A | 4/2010 |
| JP | 2019-126014 A | 7/2019 |
| JP | 2020-036226 A | 3/2020 |

* cited by examiner

*Primary Examiner* — Twyler L Haskins
*Assistant Examiner* — Angel L Garces-Rivera
(74) *Attorney, Agent, or Firm* — Venable LLP

(57) ABSTRACT

An image pickup apparatus includes a plurality of pixels each of which includes a photoelectric conversion circuit that generates electric charges in accordance with incident light from an object, a measuring circuit that measures electric charges generated in the photoelectric conversion circuit in a period outside an exposure period of the photoelectric conversion circuit, a specifying circuit that specifies a characteristic of a light source, based on a measurement result by the measuring circuit, and an adjusting circuit that adjusts the exposure period of the photoelectric conversion circuit, based on the characteristic specified by the specifying circuit.

7 Claims, 16 Drawing Sheets

FIG. 14
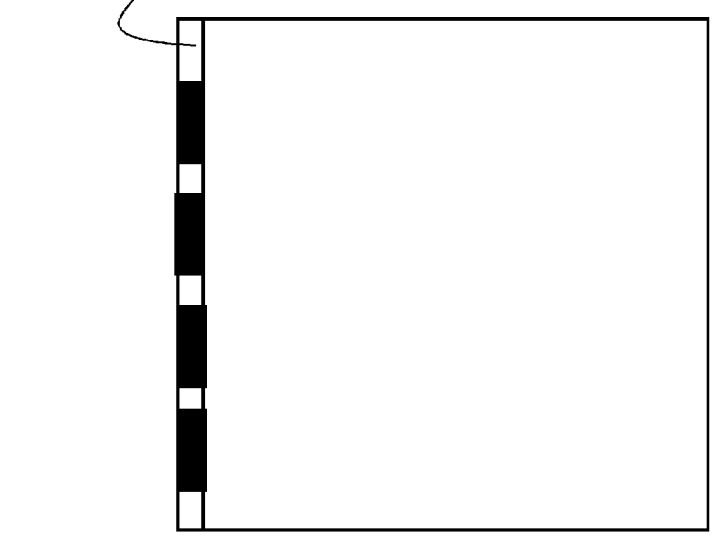
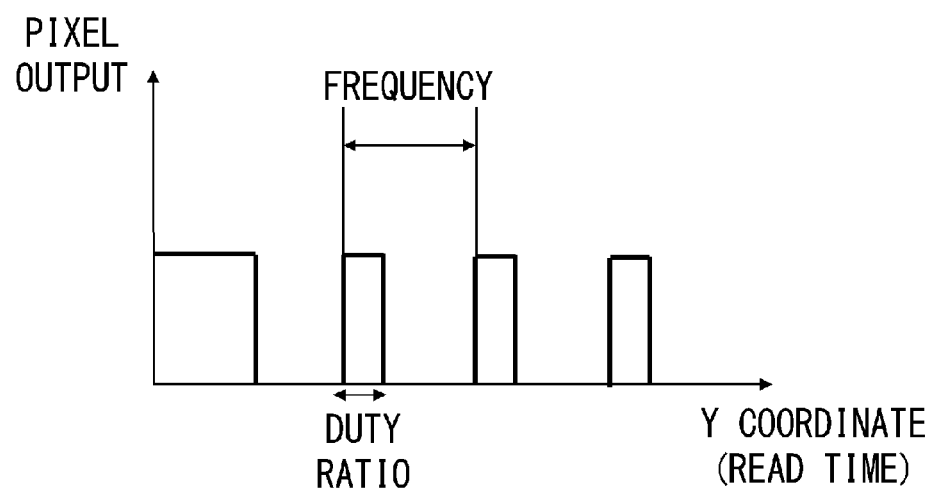

IMAGING APPARATUS, METHOD OF DRIVING IMAGING APPARATUS, IMAGING SYSTEM AND MOBILE BODY

BACKGROUND

Field

The present disclosure relates to an image pickup apparatus, a method of driving an image pickup apparatus, an imaging system and a mobile body.

Description of the Related Art

In recent years, a technique of capturing an image of a flickering object at a uniform brightness (flickerless image capturing) is proposed for image pickup apparatuses.

Japanese Patent Application Publication No. 2005-101793 discloses a technique that calculates frequency components of a light source by mathematically analyzing an acquired image, whereby flickerless image capturing is implemented. A technique of performing flickerless image capturing by performing exposure (divided exposure) at a cycle at least twice the frequency component of the light source (Nyquist frequency) is also proposed.

SUMMARY

According to the present disclosure, it is provided an image pickup apparatus including a plurality of pixels each of which includes a photoelectric conversion circuit that generates electric charges in accordance with incident light from an object, a measuring circuit that measures electric charges generated in the photoelectric conversion circuit in a period outside an exposure period of the photoelectric conversion circuit, a specifying circuit that specifies a characteristic of a light source, based on a measurement result by the measuring circuit, and an adjusting circuit that adjusts the exposure period of the photoelectric conversion circuit, based on the characteristic specified by the specifying circuit. In addition, according to the present disclosure, it is provided an image pickup apparatus including a plurality of pixels each of which includes a photoelectric conversion circuit that generates electric charges in accordance with incident light from an object, and which are disposed in a plurality of rows and a plurality of columns, a pixel for detection which includes a second photoelectric conversion circuit disposed extending over pixels in the plurality of rows, and of which pixel value is read synchronizing with reading of the plurality of pixels, a specifying circuit that specifies a frequency and a duty ratio of a light source, based on the pixel value that is read from the pixel for detection, and an adjusting circuit that adjusts an exposure period of the photoelectric conversion circuit, based on a characteristic specified by the specifying circuit.

Further, according to the present disclosure, it is provided a method of driving an image pickup apparatus that includes a plurality of pixels each of which includes a photoelectric conversion circuit that generates electric charges in accordance with incident light from an object, the method including measuring electric charges generated in the photoelectric conversion circuit in a period outside an exposure period of the photoelectric conversion circuit, specifying a characteristic of a light source, based on a measurement result in the step of measuring, and adjusting the exposure period of the photoelectric conversion circuit, based on the characteristic by the specifying.

Moreover, according to the present disclosure, it is provided an imaging system apparatus including the image pickup apparatus as described above, and a processor that processes a signal outputted from the image pickup apparatus.

Further features of the present invention will become apparent from the following description of exemplary embodiments with reference to the attached drawings.

BRIEF DESCRIPTION OF THE DRAWINGS

FIG. 14 is a schematic diagram indicating a method of specifying characteristics of a light source according to Embodiment 3;

DESCRIPTION OF THE EMBODIMENTS

Figure 1:
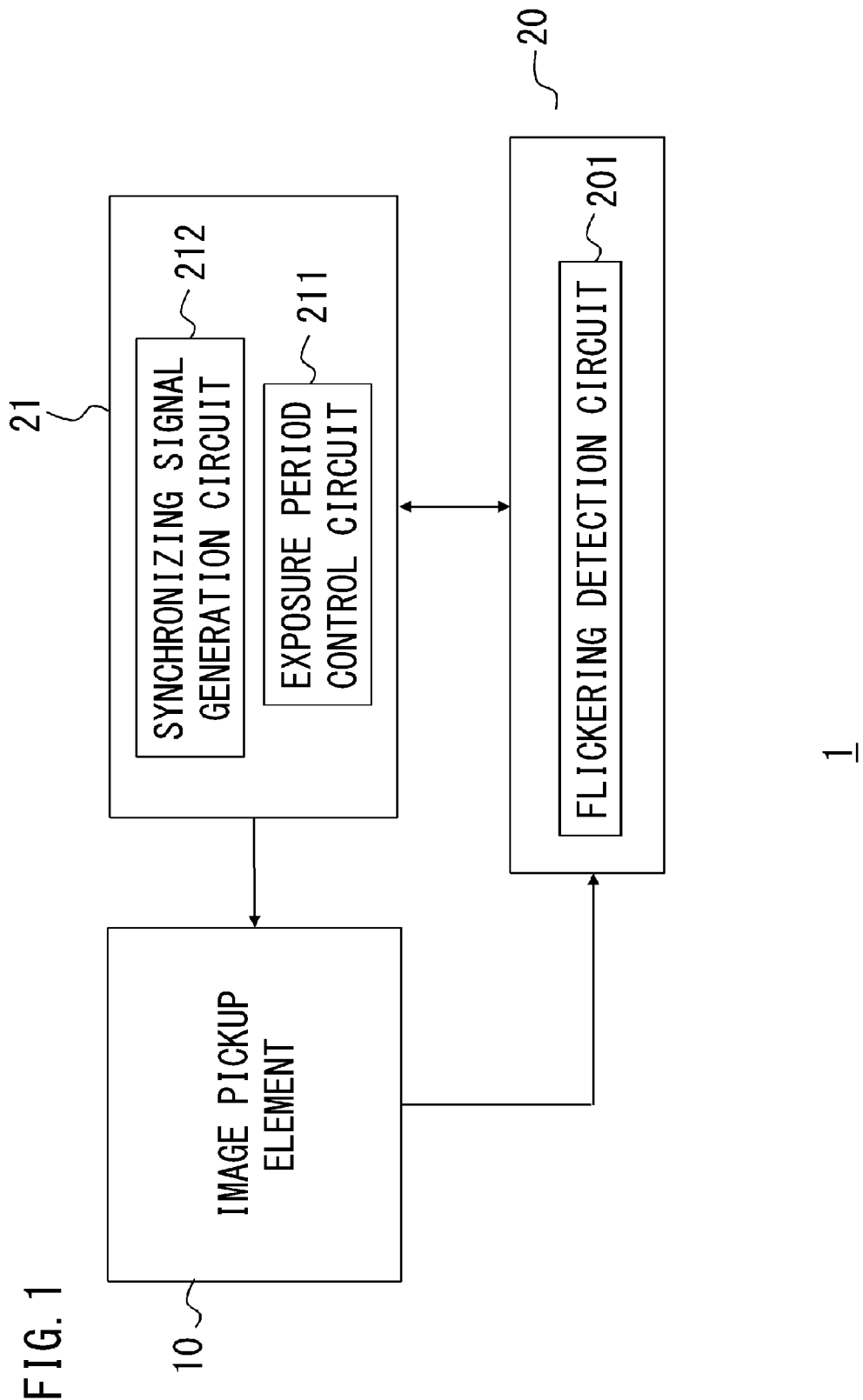
FIG. 1 is a block diagram of an image pickup apparatus according to Embodiment 1.

In the case of using the above mentioned technique, however, the configuration of the image pickup apparatus may become complicated since the mathematical processing is executed for an image of each captured frame. In the case of performing divided exposure at a Nyquist frequency as well, the brightness of each frame may disperse depending on the flickering cycle (duty ratio) of the light source (e.g. in a case where the duty ratio is not 50%).

With the foregoing in view, it is an object of the present disclosure to provide a technique to reduce dispersion of brightness when an image of an object, which flickers at an arbitrary cycle, is captured.

Embodiments of the present disclosure will be described with reference to the drawings. In the drawings, same or similar composing elements, members or processing steps are denoted with same reference signs, and redundant description is omitted. In each drawing, a part of the compositing elements, members or processing steps is omitted.

In an image pickup apparatus according to Embodiment 1, each pixel includes a photoelectric conversion circuit that stores electric charges in accordance with incident light from an object. The image pickup apparatus also includes a measuring circuit that measures electric charges, which are generated in the photoelectric conversion circuit as electric current in a period other than an image capturing period when a user (photographer) of the image pickup apparatus captures an image. A control circuit of the image pickup apparatus calculates a flickering cycle of the object based on the change of the electric current value measured by the measuring circuit, and changes the driving of a driving circuit based on the calculation result.

According to this embodiment, the electric current generated by the electric charges, which are generated in the period other than the image capturing period by the user, is measured, whereby imaging can be performed with maintaining a predetermined brightness for the flickering object.

Embodiment 1

FIG. 1 is a block diagram depicting a general configuration of the image pickup apparatus according to Embodiment 1. The image pickup apparatus 1 includes an image pickup element 10, a detection circuit 20 and a control circuit 21. The image pickup element 10 is such a solid-state image pickup element as a complementary metal oxide semiconductor (CMOS) image sensor, for example. An object image is formed on the image pickup element 10 by an optical system (not illustrated) of the image pickup apparatus 1, and the image pickup element 10 outputs image signals in accordance with the object image.

The detection circuit 20 includes a flickering detection circuit 201. The flickering detection circuit 201 is a specifying circuit that specifies a flickering cycle of the object and the like by measuring electric current generated by electric charges, which are generated in the period other than the exposure period set by the user. The detection circuit 20 also calculates the ratio between a period in which the electric current value of the measured electric current is low; and a period in which the electric current value of the measured electric current is high.

The control circuit 21 includes an exposure period control circuit 211 and a synchronizing signal generation circuit 212. The exposure period control circuit 211 is an adjusting circuit that adjusts the exposure period, the start timing of the exposure period, and the like, based on the detection result by the flickering detection circuit 201 of the detection circuit 20. The synchronizing signal generation circuit 212 includes a clock circuit and a gate circuit, and generates a vertical synchronizing signal and a horizontal synchronizing signal to start reading of a reading target row.

Figure 2:
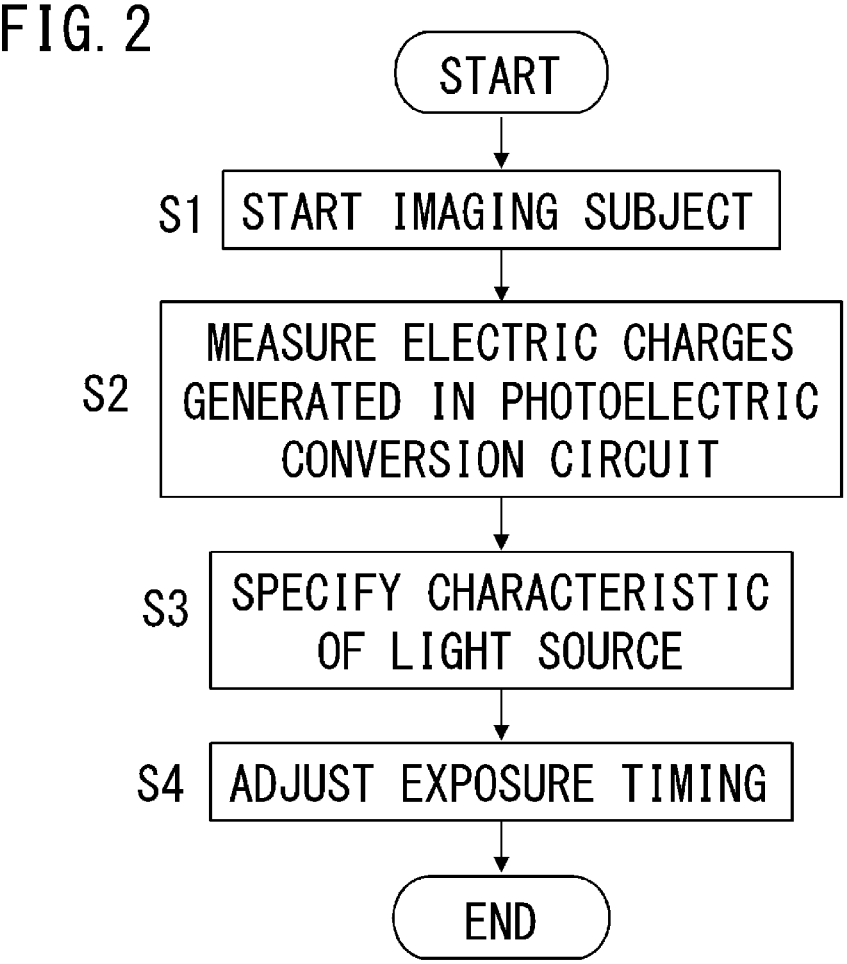
FIG. 2 is a flow chart depicting an example of processing executed by the image pickup apparatus according to Embodiment 1.

FIG. 2 is a flow chart depicting an example of the processing steps of a method of driving the image pickup apparatus 1, which are executed in the image pickup apparatus 1 according to this embodiment. For example, the control circuit 21 of the image pickup apparatus 1 executes the processing steps in the flow chart by controlling the operation of each circuit in the apparatus. In step S1, the control circuit 21 starts capturing an image of an object by the image pickup apparatus 1. In step S2, the image pickup apparatus 1 measures the electric charges generated in the photoelectric conversion circuit of the image pickup element 10. In step S3, the detection circuit 20 specifies the characteristics (e.g. frequency, duty ratio) of a light source (object) based on the measurement result in step S2. In step S4, the control circuit 21 adjusts the exposure period of the photoelectric conversion circuit of the image pickup element 10. The configuration and processing of the image pickup apparatus 1, to implement the processing of each step, will be described below in detail.

Figure 3:
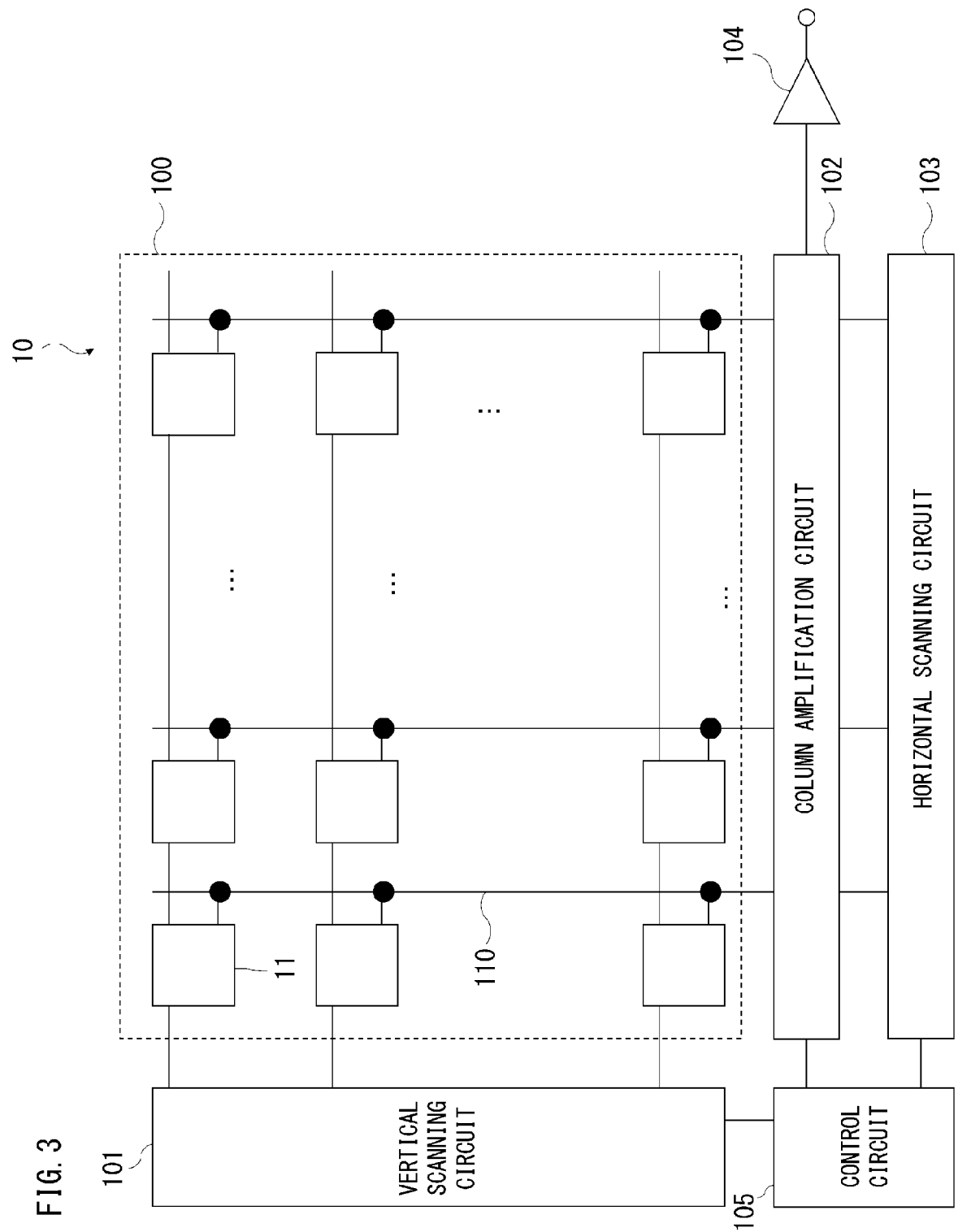
FIG. 3 is a block diagram of an image pickup element according to Embodiment 1.

FIG. 3 is a block diagram depicting a general configuration of the image pickup element 10 according to Embodiment 1. The image pickup element 10 includes a pixel circuit 100, a vertical scanning circuit (driving circuit) 101, a column amplification circuit 102, a horizontal scanning circuit 103, an output circuit 104 and a control circuit 105. The pixel circuit 100 includes a plurality of pixels 11 which are disposed in a plurality of rows and a plurality of columns in XY orthogonal coordinates. In this description, it is assumed that the row direction is the horizontal direction in the drawing, and the column direction is the vertical direction in the drawing. A micro lens and a color filter may be disposed on each pixel 11. The color filter is a primary color (red, blue or green) filter, for example, and is disposed on each pixel 11 according to a Bayer array. A part of the pixels 11 are optical black (OB) pixels where the light is shielded. In a plurality of pixels 11, a distance measurement row, where focus detection pixels to output pixel signals for focus detection are disposed, and an imaging row where imaging pixels to output pixel signals for generating an image are disposed, may be disposed. In Embodiment 1, it is assumed that the pixels 11 of the image pickup element 10 are operated by a global shutter method. In other words, in all the pixels 11 disposed in the pixel circuit 100, the transfer of electric charges from the photoelectric conversion circuit PD to the electric charge holding circuit MEM are collectively controlled.

The vertical scanning circuit 101 is constituted of a shift register, a gate circuit, a buffer circuit, and the like. The vertical scanning circuit 101 outputs control signals to the pixels 11 based on a vertical synchronizing signal, a horizontal synchronizing signal, a clock signal, and the like, and drives the pixels 11 for each row. The column signal line 110 is disposed for each pixel of the pixels 11, and pixels 11 of a same column output column signals to a common column signal line 110. The column amplification circuit 102 amplifies a pixel signal outputted to the column signal line 110, and performs correlated double sampling processing based on a signal when the pixel 11 is reset and a signal when the photoelectric conversion is performed. The horizontal scanning circuit 103 supplies a control signal to a switch connected to an amplifier of the column amplification circuit 102, controlling the switch ON or OFF. The output circuit 104 is constituted of a buffer amplifier, a differential amplifier, and the like, and outputs a pixel signal from the column amplification circuit 102 to a signal processing circuit outside the image pickup apparatus. An AD conversion circuit may be disposed in the image pickup element 10, so that a digital image signal is outputted to the AD conversion circuit. The control circuit 105 generates various control signals and driving signals based on the clock signal, the synchronizing signal, and the like, so as to control the vertical scanning circuit 101, the column amplification circuit 102 and the horizontal scanning circuit 103.

Figure 4:
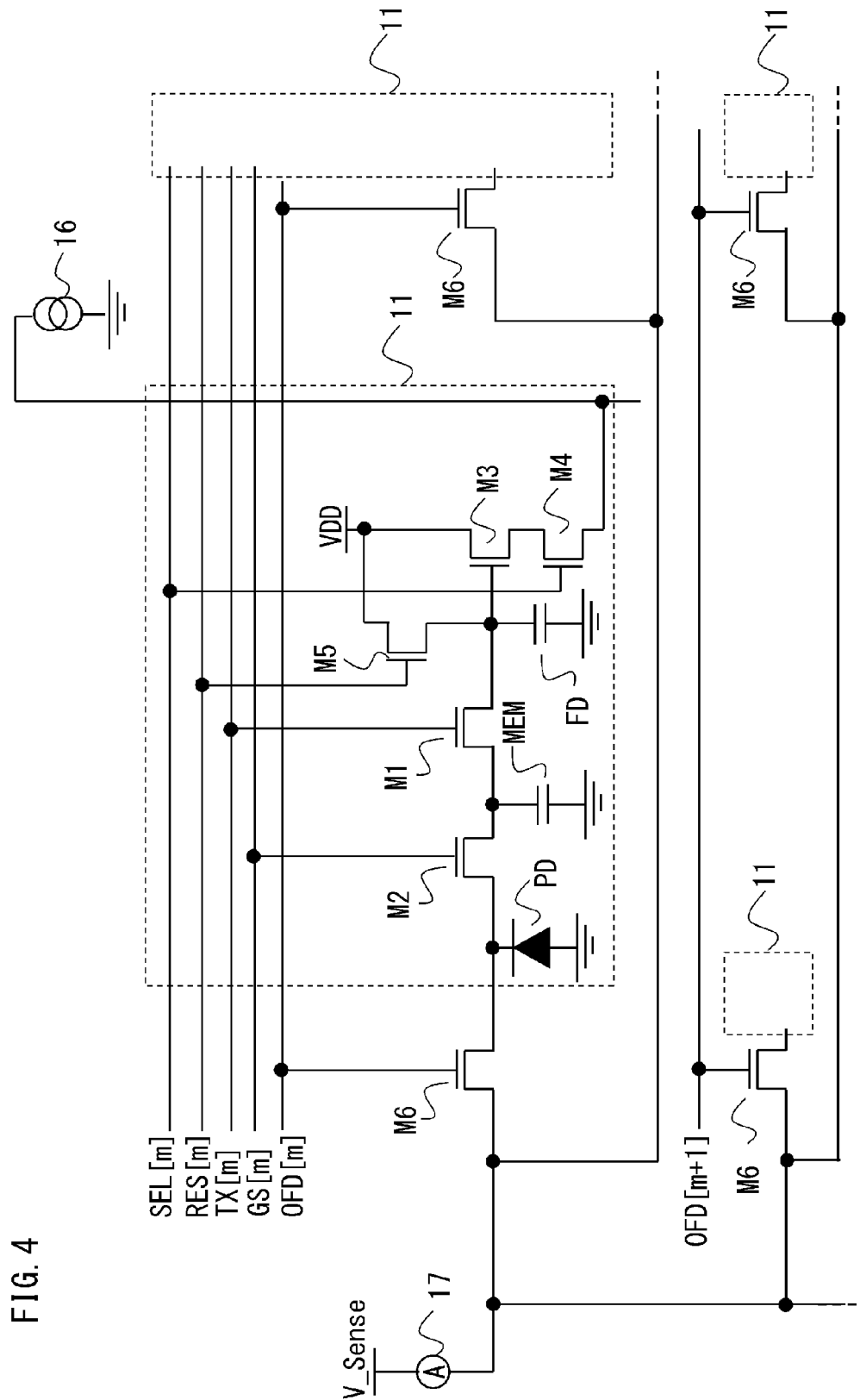
FIG. 4 is a diagram indicating an equivalent circuit of a pixel according to Embodiment 1.

FIG. 4 indicates an equivalent circuit of a pixel 11 and an electric current detection circuit according to Embodiment 1. FIG. 4 indicates four pixels 11 (2 rows×2 columns) out of a plurality of pixels 11 that are two-dimensionally arrayed in the row direction and the column direction, but the actual image pickup apparatus 1 includes many more pixels. Each pixel 11 includes a photoelectric conversion circuit PD, a transfer transistor M2, a floating diffusion circuit FD, a transfer transistor M1, an amplification transistor M3, a selection transistor M4, a reset transistor M5, and an OFD transistor M6.

The photoelectric conversion circuit PD performs photoelectric conversion on an incident light from an object, and stores electric charges generated by the photoelectric conversion. The transfer transistor M2 turns ON (conducts) to transfer the electric charges stored in the photoelectric conversion circuit PD to the electric charge holding circuit MEM. In Embodiment 1, the transfer transistors M2 of all the pixels are collectively controlled. In other words, the exposure period in the photoelectric conversion circuit PD is the same in all the pixels. When the transfer transistor M1 turns ON, the electric charges held in the electric charge holding circuit MEM are transferred to the floating diffusion circuit FD. The power supply voltage VDD is applied to a drain of the amplification transistor M3, and a source of the amplification transistor M3 is connected to the column signal line 110 via the selection transistor M4. The amplification transistor M3 constitutes a source follower, and outputs a signal, which is based on the voltage of the floating diffusion circuit FD, to the column signal line 110 via the selection transistor M4. A constant current source 16 is connected to the column signal line 110. A power supply voltage VDD is applied to a drain of the reset transistor M5, and the reset transistor M5 turns ON to reset the voltage of the floating diffusion circuit FD. Each pixel 11 also includes an OFD transistor M6 to discharge unnecessary electric charges from the electric charges generated in the photoelectric conversion circuit PD by receiving light. In Embodiment 1, when the OFD transistor M6 of the pixel 11 turns ON, the electric charges become electric current by a voltage for detection V_Sense, and is measured by an ammeter 17.

In the pixel unit 100, a common control signal is supplied to the pixels 11 in a same row from the vertical scanning circuit 101. In other words, control signals TX (m), SEL (m), RES (m) and OFD (m) are supplied respectively to the transfer transistor M1, the selection transistor M4, the reset transistor M5, and the transistor M6 of each pixel 11 in the mth row (m is a positive integer). In the case of the transfer transistor M2, the same control signal GS is supplied to all the pixels 11 of the pixel unit 100. These transistors turn ON when the control signal is at high level, and turn OFF when the control signal is at low level. By controlling the control signals of each row to ON or OFF simultaneously, the exposure periods of a plurality of pixels 11 can be simultaneously controlled. A plurality of pixels 11 may share one amplification transistor M3.

Figure 5:
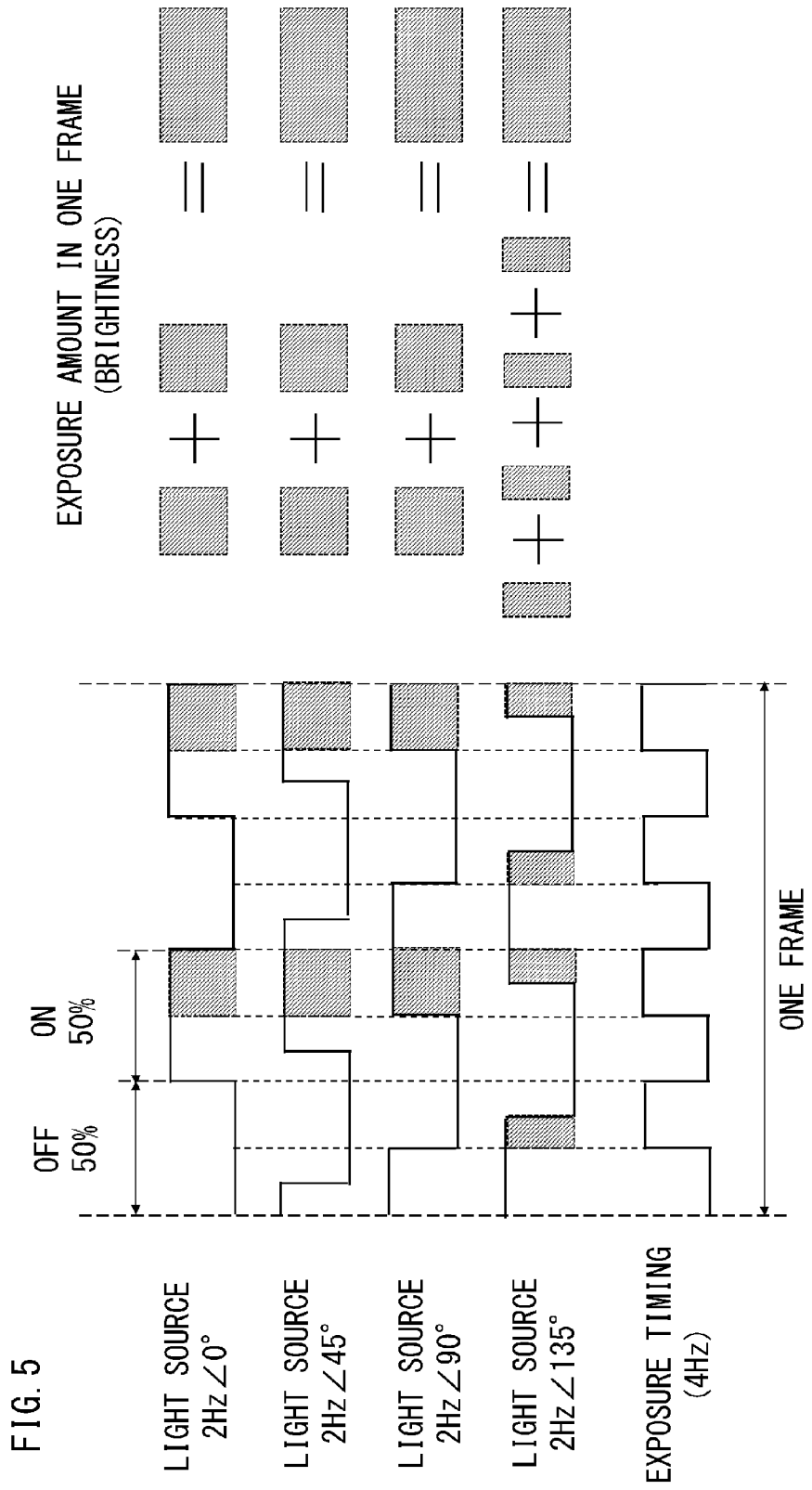
FIG. 5 is a diagram for describing an example of a relationship between a duty ratio and exposure amount.
Figure 6:
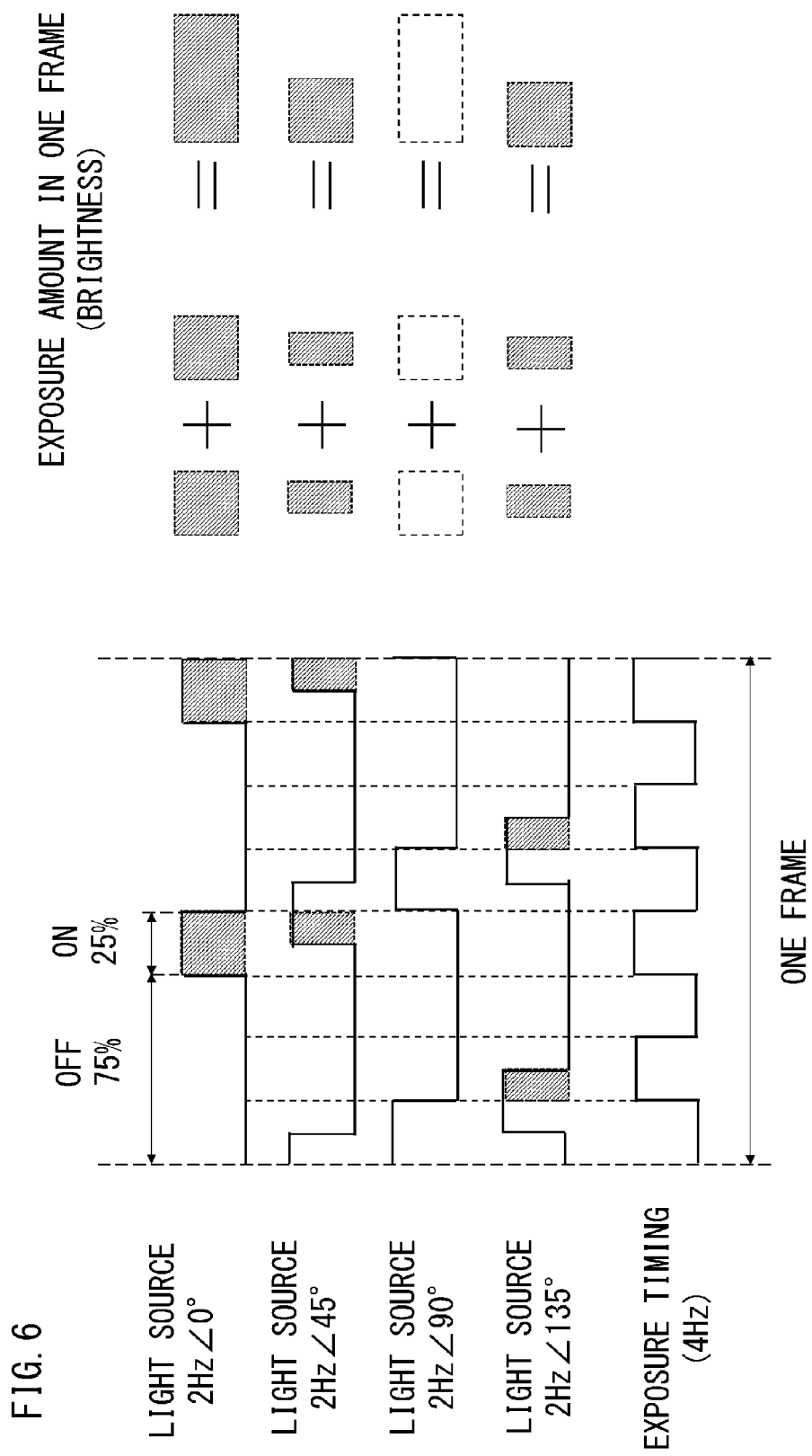
FIG. 6 is a diagram for describing another example of a relationship between a duty ratio and exposure amount.

FIG. 5 and FIG. 6 are diagrams for describing problems in a case of imaging a light source which flickers at a predetermined duty ratio. FIG. 5 indicates a case where a divided exposure was performed on a light source flickering at a 2 Hz frequency and 50% duty ratio. The split exposure was performed at 4 Hz, which is a frequency double the flickering frequency of the light source based on the Nyquist sampling theorem. In FIG. 5, the quantity of light by which pixels are exposed in one frame (indicated by shaded portion in FIG. 5), that is, the brightness of the image to be captured, is constant regardless the phase of the light source. FIG. 6 indicates a case where the divided exposure was performed the same as FIG. 5 was performed on a light source flickering at a 2 Hz frequency and 25% duty ratio. In FIG. 6, the quantity of light by which pixels are exposed in one frame differs if the phase of the light source differs, hence in the case of imaging this light source, dispersion is generated in the brightness of the image to be captured. This dispersion of the brightness of the image becomes a problem particularly in the case of capturing a moving image.

Figure 7:
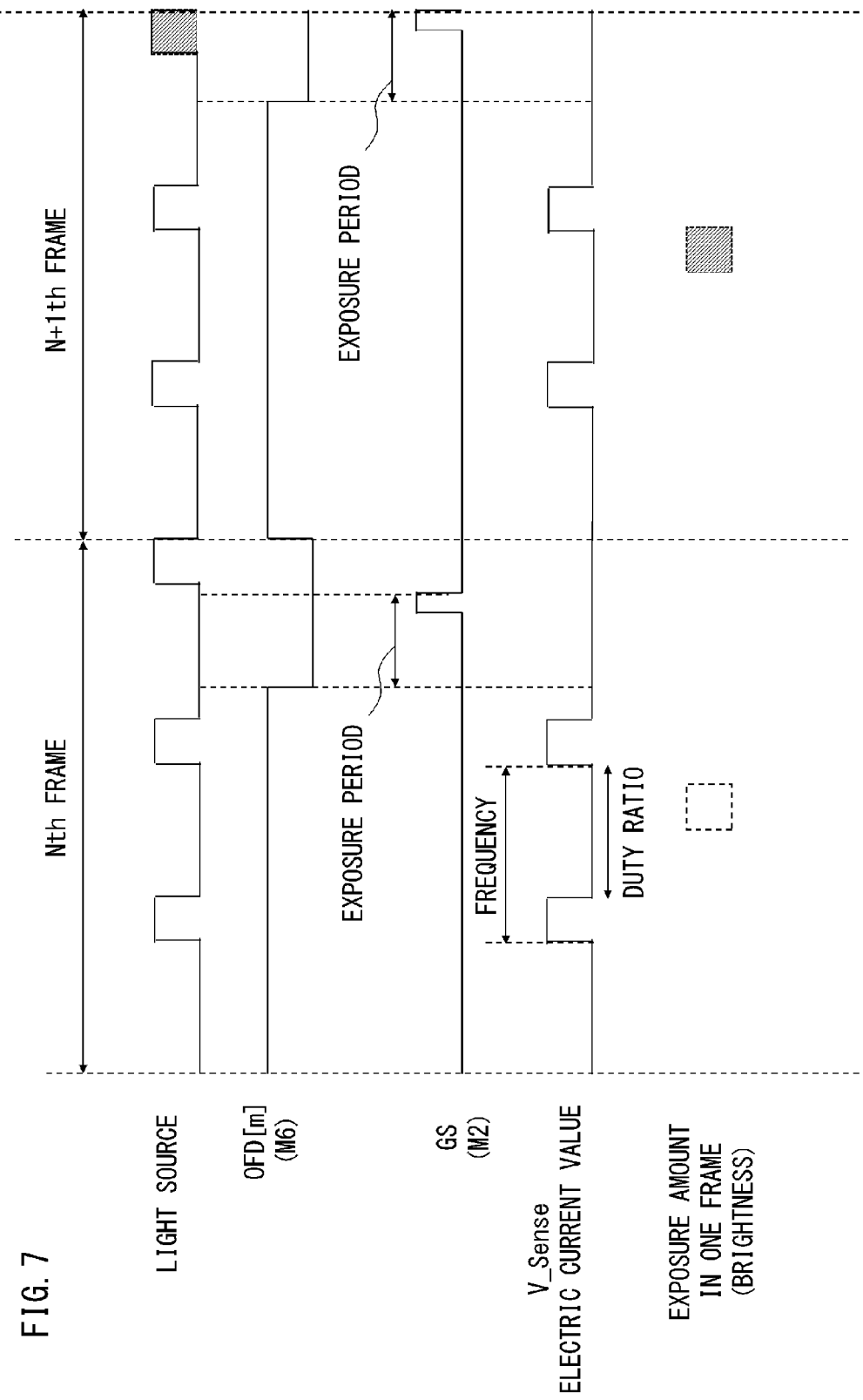
FIG. 7 is a time chart indicating an example of a driving method of the image pickup apparatus according to Embodiment 1.

FIG. 7 is a time chart indicating an example of a method of driving the image pickup apparatus when the flickering is removed to solve the above mentioned problem. The OFD transistor M6 indicated in FIG. 4 becomes the ON state until the start of the exposure period set by the user, and supplies the electric charges generated in the photoelectric conversion circuit PD to the voltage for detection V_Sense. When the exposure period starts, the transistor M6 turns OFF and stores electric charges to the photoelectric conversion circuit PD. When the exposure period elapses, the transfer transistors M2 collectively turns ON in all the pixels, and the stored electric charges are transferred to the electric charge holding circuit MEM. The exposure period here refers to, for example, a period from the point when the OFD transistor M6 is turned OFF in the transfer transistor M2 in the OFF state to the point when the transfer transistor M2, which was turned ON once, is turned OFF again.

In the time chart in FIG. 7, the light source is flickering in the Nth frame, hence the exposure period and the light-emitting period of the light source do not overlap, and the image is captured in the state where the light source is turned off (or in a dark state). Further, in the Nth frame, in a period when the transistor M6 is ON, the electric current that is supplied to the voltage for detection V_Sense is measured by the ammeter 17. Normally the amount of electric charges generated in the photoelectric conversion circuit PD is in proportion to the quantity of light entering the photoelectric conversion circuit PD. Therefore the frequency and the duty ratio of the light source can be calculated based on the result of measuring the electric current value in the voltage for detection V_Sense by the ammeter 17. For example, in a case where the measurement result of the ammeter 17 indicates a repetition of 10 ms in a period when the electric current value is high and 3 ms in a period when the electric current value is low, the frequency of the light source is calculated as 250 Hz, and the duty ratio is calculated as 25%. Based on the electric current value of the electric charges generated outside the exposure period in the photoelectric conversion circuit PD, measured by the ammeter 17, the control circuit 21 specifies a period in the Nth frame when the light-emitting period of the light source and the exposure period overlap, using the calculated frequency and duty ratio. Then based on the specified period, the control circuit 21 changes the timing when the exposure period starts in the N+1th frame.

In the time chart in FIG. 7, the frequency and the duty ratio of the light source are calculated in the Nth frame based on which exposure period is changed in the N+1th frame. However, in the time chart in FIG. 7, the control circuit 21 may adjust the exposure period in the Nth frame based on the result of measuring the electric current value in the voltage for detection V_Sense by the ammeter 17 in the Nth frame.

Figure 8:
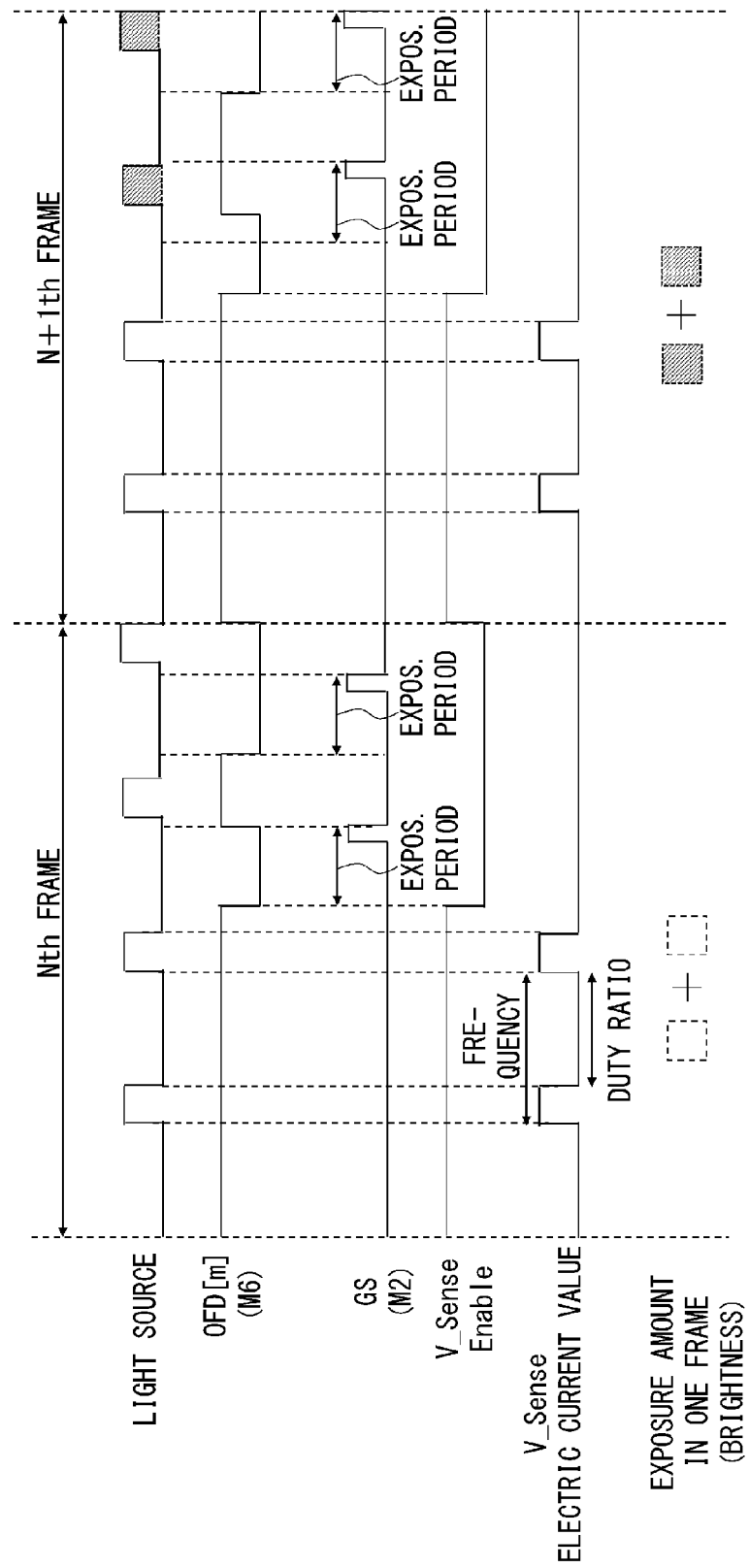
FIG. 8 is a time chart indicating another example of a driving method of the image pickup apparatus according to Embodiment 1.

Embodiment 1 is also applicable to the case of the divided exposure based on the time chart exemplified in FIG. 8. When the divided exposure is performed, the operation timings of the transistors M6 and M2 indicated in FIG. 4 are controlled. In the case of the example of the time chart in FIG. 8, driving of the transistor M6 and driving of the transistor M2 are controlled respectively, so that the divided exposure is performed twice in one frame. In the time chart in FIG. 8, just like FIG. 7, the exposure period and the light-emitting period of the light source do not overlap in the Nth frame, and the image is captured in the state where the light source is turned off (or in a dark state). In the N+1th frame, on the other hand, the frequency and duty ratio are calculated using the electric current value in the voltage for detection V_Sense, which is measured by the ammeter 17 in the Nth frame, and the control circuit 21 adjusts the exposure period based on the calculation result, hence the light-emitting period of the light source and the exposure period overlap. The control circuit 21 may adjust the exposure period in the Nth frame based on the calculation result of the frequency and the duty ratio of the light source in the Nth frame, just like the case of FIG. 7.

Figure 9:
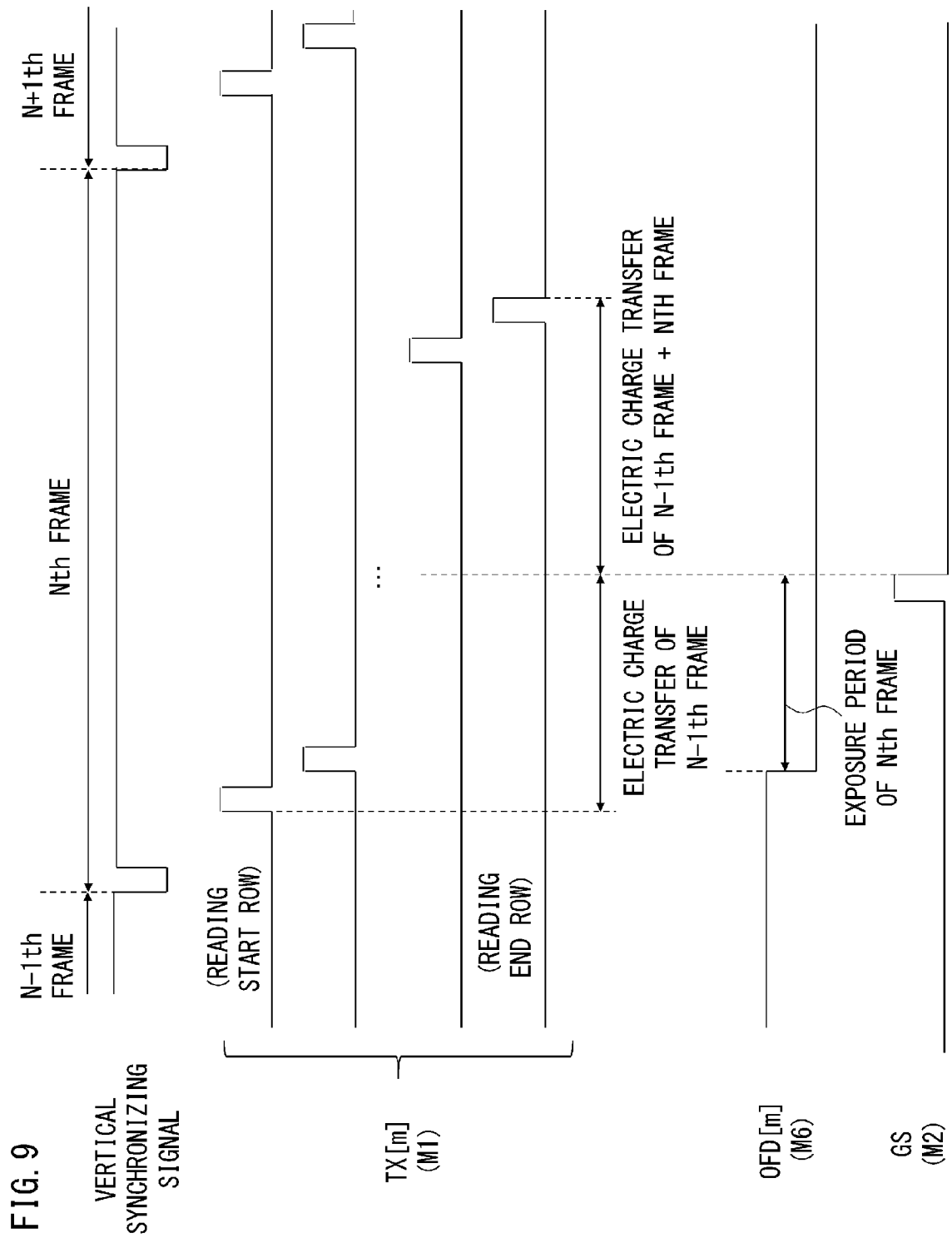
FIG. 9 is a time chart indicating limitations of the driving method of the image pickup apparatus according to Embodiment 1.

The above description is based on the assumption that the exposure period can be freely changed. Actually, however, the exposure period cannot be freely changed since the transfer transistor M1 in FIG. 4 performs reading for each row. This aspect will be described with reference to the time chart in FIG. 9. In the time chart in FIG. 9, the transistor M2 is turned ON in a state where transfer using the transfer transistor M1 is not completed for all the rows. In this case, electric charges stored in the electric charge holding circuit MEM are transferred in the N−1th frame until the transistor M2 is turned ON. When the transistor M2 is turned ON, electric charges generated by the photoelectric conversion circuit PD in the Nth frame are held in addition to the electric charges held in the electric charge holding circuit MEM in the N−1th frame. For the rows after the transistor M2 is turned ON, when the transfer transistor M1 is turned ON, the total of the electric charges generated in the N−1th frame and the electric charges generated in the Nth frame are transferred. In other words, after the row when the transfer transistor M2 is turned ON, an imaging result, of which exposure period is different, is generated in one frame of the image.

Figure 10:
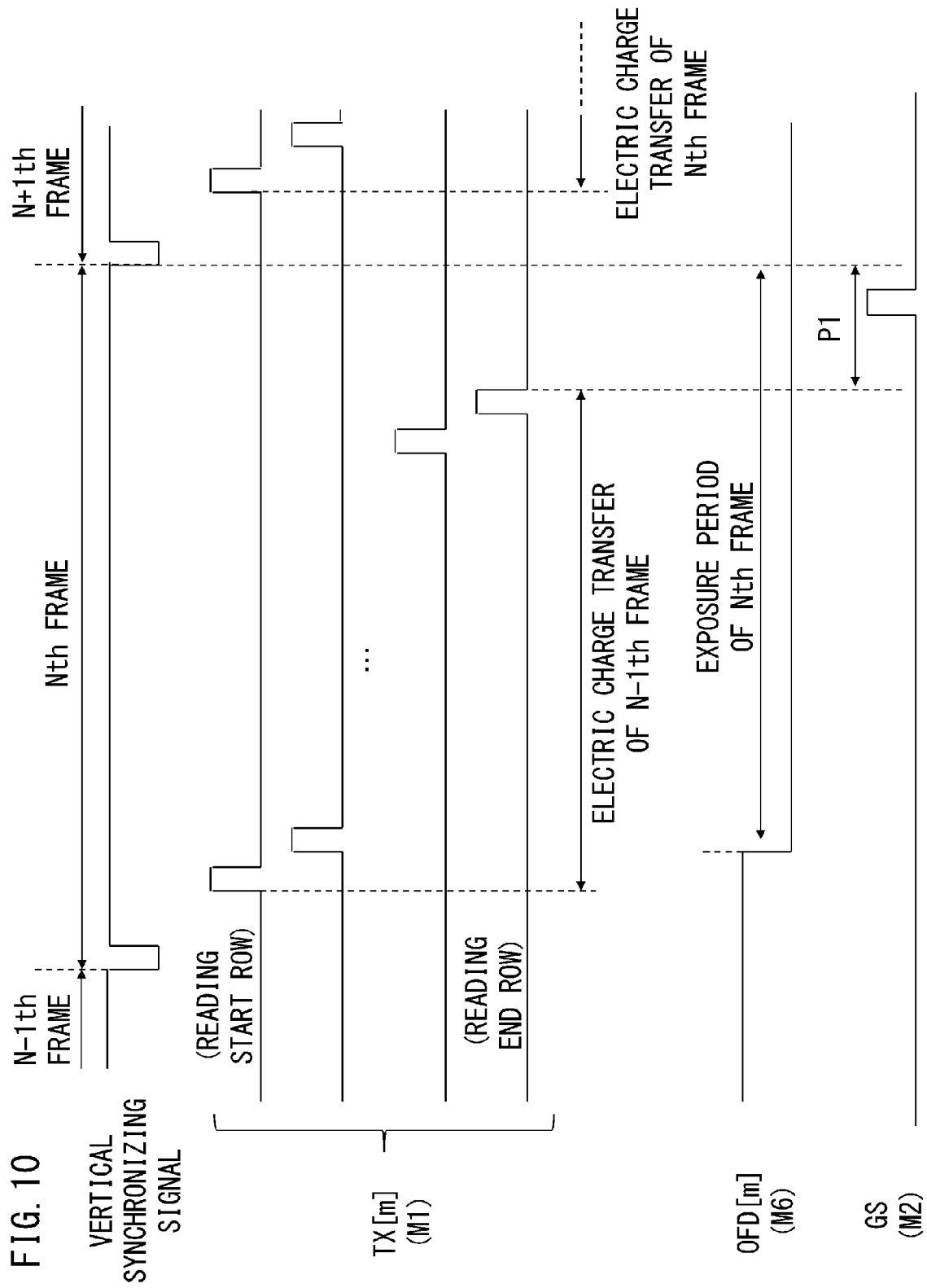
FIG. 10 is a time chart indicating limitations of the driving method of the image pickup apparatus according to Embodiment 1.

Therefore as the time chart in FIG. 10 indicates, the timing to turn the transfer transistor M2 ON is limited to the period from the point when the reading of the reading target row is completed to the point when the reading of the next frame starts (point when the vertical synchronizing signal is generated). In FIG. 10, this period is indicated as "P1". In Embodiment 1, the exposure period is set in period P1.

According to Embodiment 1, image capturing of a flickering light source can be performed such that the brightness of the light source becomes constant among frames without dropping the performance of the image pickup apparatus.

Embodiment 2

In Embodiment 1, the exposure period must be set to the period P1 from the point when the reading of the reading target row is completed to the point when the reading of the next frame starts. This limitation becomes more difficult in the case of performing the divided exposure in the image pickup apparatus. Examples of a method of expanding the period in which the transfer transistor M2 can be ON include: shortening the transfer period; decreasing a number of rows to be read; and decreasing the frame rate (increasing the time from the end of reading all the rows to the generation of the next vertical synchronizing signal). However, regardless which method is used, the performance of the image pickup apparatus may drop. With the foregoing in view, an image pickup apparatus according to Embodiment 2 uses a following configuration, whereby even if the divided exposure is performed, image capturing of a flickering light source can be performed such that the brightness of the light source becomes constant among frames, without dropping the performance of the image pickup apparatus.

The image pickup apparatus according to Embodiment 2 will be described next. In the following description, a configuration that is different from the image pickup apparatus according to Embodiment 1 will be the focus. Further, in the following description, a composing element the same as Embodiment 1 is denoted with the same reference sign, and detailed description thereof is omitted.

Figure 11:
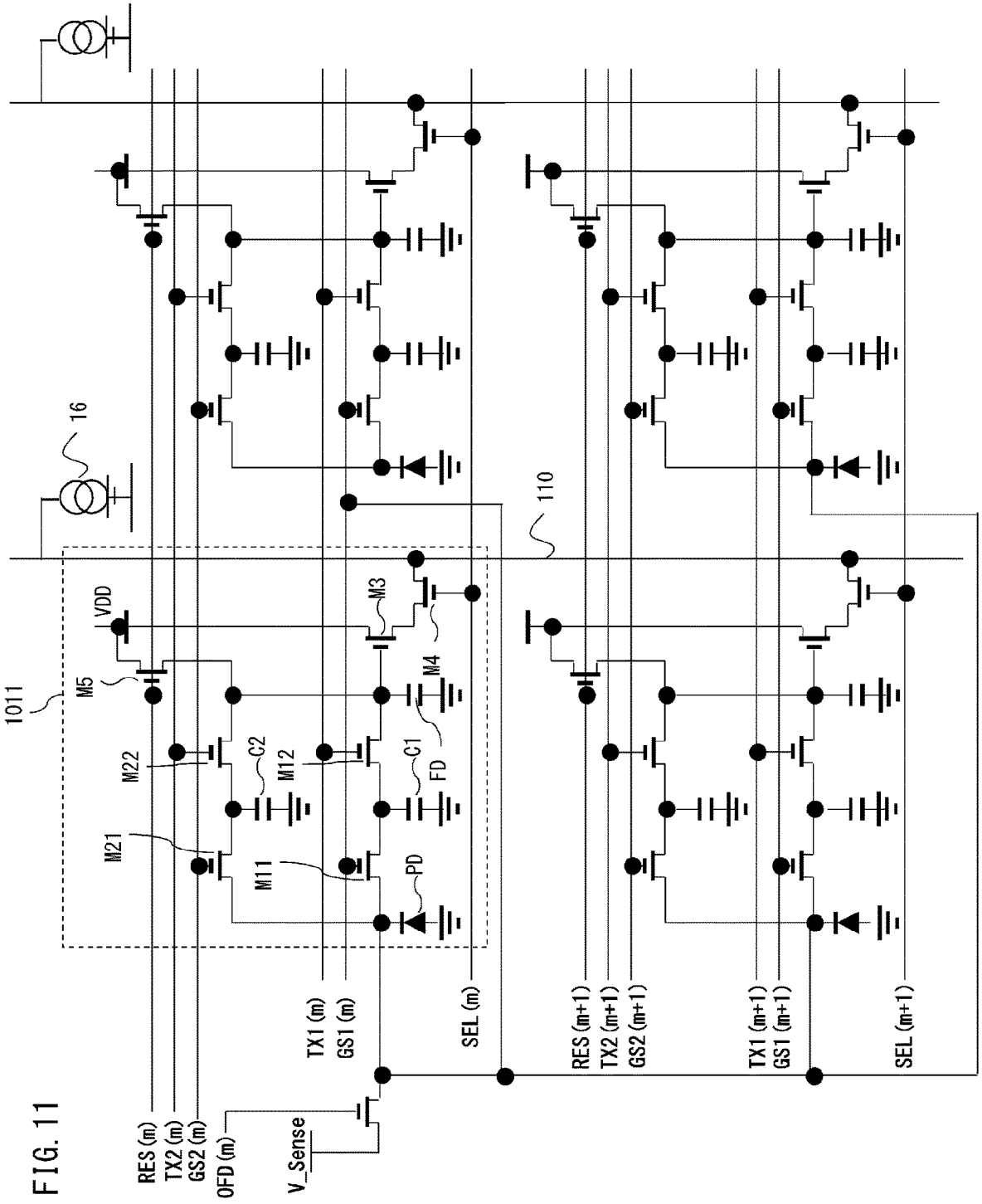
FIG. 11 is a diagram indicating an equivalent circuit of a pixel according to Embodiment 2.

FIG. 11 indicates an equivalent circuit of a pixel 1011 according to Embodiment 2. FIG. 11 indicates four pixels 1011 (2 rows×2 columns) out of a plurality of pixels 1011 that are two-dimensionally arrayed in the row direction and the column direction, but the actual image pickup apparatus 1 includes many more pixels. Each pixel 1011 includes the photoelectric conversion circuit PD, the floating diffusion circuit FD, a first memory transfer transistor M11 and a second memory transfer transistor M21. Further, each pixel 1011 includes the first transfer transistor M12, the second transfer transistor M22, the amplification transistor M3, the selection transistor M4, the reset transistor M5, and a first holding circuit C1 and a second holding circuit C2.

The photoelectric conversion circuit PD performs photoelectric conversion on an incident light from an object, and stores electric charges generated by the photoelectric conversion. The first memory transfer transistor M11 transfers the electric charges of the photoelectric conversion circuit PD to the first holding circuit C1, and the first transfer transistor M12 transfers the electric charges of the first holding circuit C1 to the floating diffusion circuit FD. In the same manner, the second memory transfer transistor M21 transfers the electric charges of the photoelectric conversion circuit PD to the second holding circuit C2, and the second transfer transistor M22 transfers the electric charges of the second holding circuit C2 to the floating diffusion circuit FD. Power supply voltage VDD is applied to the drain of the amplification transistor M3, and the source is connected to the column signal line 110 via the selection transistor M4. The amplification transistor M3 constitutes a source follower, and outputs a signal, which is based on the voltage of the floating diffusion circuit FD, to the column signal line 110 via the selection transistor M4. The constant current source 16 is connected to the column signal line 110. Power supply voltage VDD is applied to the drain of the reset transistor M5, and the reset transistor M5 turns ON to reset the voltage of the floating diffusion circuit FD.

In the pixel unit 100, a common control signal is supplied to the pixels 1011 in a same row from the vertical scanning circuit 101. In other words, control signals GS1($m$) and GS2($m$) are supplied to the first memory transfer transistor M11 and the second memory transfer transistor M21 of each pixel 1011 in the mth row respectively. Further, control signals TX1($m$) and TX2($m$) are supplied to the first transfer transistor M12 and the second transfer transistor M22 respectively. Furthermore, control signals SEL(m) and RES(m) are supplied to the selection transistor M4 and the reset transistor M5 respectively.

These transistors become ON when the control signal is at a high level, and become OFF when the control signal is at a low level. By controlling the control signals of each row to ON or OFF simultaneously, the exposure periods of a plurality of pixels 1011 can be simultaneously controlled. A plurality of pixels 11 may share one amplification transistor M3. An overflow drain transistor may be formed in the photoelectric conversion circuit PD. Beside the effective pixels, the pixel unit 100 may include pixels that do not output an image, such as light-shielding pixels and dummy pixels which do not include a photoelectric conversion circuit.

In the pixel 1011, an image of a short exposure or an image of a long exposure can be acquired by controlling the timing of ON or OFF of the first memory transfer transistor M11 and the second memory transfer transistor M21. Further, the electric charges of a long exposure can be transferred from the photoelectric conversion circuit PD to the first holding circuit C1 by turning the first memory transfer transistor M11 ON, and the electric charges of a short exposure can be transferred from the photoelectric conversion circuit PD to the second holding circuit C2 by turning the second memory transfer transistor M21 ON. However, in Embodiment 2, the timings of ON or OFF of the first memory transfer transistor M11 and the second memory transfer transistor M21 may be controlled regardless the duration of the exposure time (even if the exposure time is the same).

The sequence and number of times of transferring electric charges from the photoelectric conversion circuit PD to the first holding circuit C1 and the second holding circuit C2 may be determined as required. For example, after the first memory transfer transistor M11 is turned ON, the second memory transfer transistor M21 may be turned ON, then the first memory transfer transistor M11 may be turned ON. If the first memory transfer transistor M11 or the second memory transfer transistor M21 alone is turned ON or OFF, the electric charges of a long exposure may be stored in the first storing circuit C1, and the electric charges of a short exposure may be stored in the second storing circuit C2. In this case, the amount of electric charges stored in the first holding circuit C1 becomes the amount of electric charges exposed in a period when the first memory transfer transistor M11 is ON. The amount of electric charges stored in the second holding circuit C2 becomes the amount of electric charges exposed in a period when the second memory transfer transistor M21 is ON. In a period when the memory transfer transistors M11 and M21 are OFF ("Tc1" and "Tc2" in FIG. 12), electric charges may be stored in the photoelectric conversion circuit PD, and the memory transfer transistors M11 and M21 may be turned ON so as to transfer the electric charges to the first holding circuit C1 and the second holding circuit C2. In this case, the amount of electric charges held in the first holding circuit C1 and the second holding circuit C2 becomes the amount of electric charges stored in the photoelectric conversion circuit PD in the period when the memory transfer transistors M11 and M21 are OFF.

Figure 12:
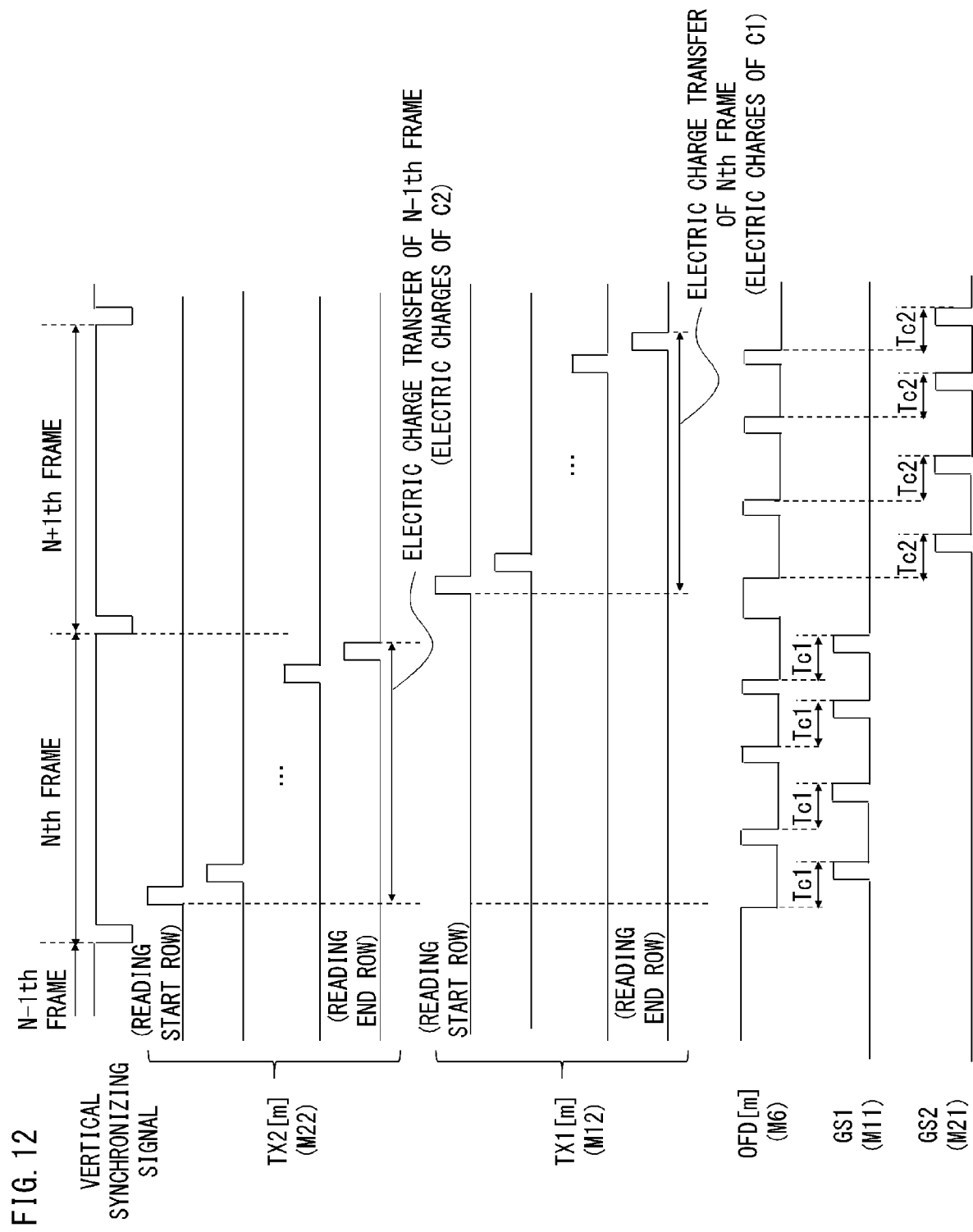
FIG. 12 is a time chart indicating an example of a driving method of the image pickup apparatus according to Embodiment 2.

FIG. 12 is a time chart indicating a case of capturing the image of a flickering light source using the pixel 1011 indicated in FIG. 11. In the time chart in FIG. 12, the electric charges transferred by the transistor M22 in the Nth frame is the electric charges stored in the second holding circuit C2 in the N−1th frame. Therefore even if the transistor M11, which transfers the electric charges to the first holding circuit C1, is operated in the Nth frame, the electric charges stored in the second holding circuit C2 are not affected. Further, In the N+1th frame, the transistor M12 is operated, and the electric charges stored in the first holding circuit C1 are transferred. In the N+1th frame as well, even if the transistor M21, which transfers the electric charges to the second holding circuit C2, is operated, the electric charges stored in the first holding circuit C1 are not affected.

As described above, according to Embodiment 2, a plurality of sets of the electric charge holding circuits C1 and C2 which hold electric charges generated in the photoelectric conversion circuit, and the transistors M11 and M21, which control the transfer of the electric charges generated in the photoelectric conversion circuit PD to the electric charge holding circuits C1 and C2, are disposed for each photoelectric conversion circuit PD. By changing the operation timings of the transistors M11 and M21 in each set of the plurality of sets, the control circuit 21 alternately transfers the electric charges generated in the photoelectric conversion circuit in each set to the electric charge holding circuit in frame units. By repeating this driving control, the limitation for the timings at which the transistor M2 can be turned ON can be eliminated, in other words, the transistor M2 can be turned ON at any timing in one frame.

Further, according to Embodiment 2, the memory transfer transistors M11 and M21 can be turned ON at a timing overlapping with the light emission of the light source, based on the frequency and the duty ratio of the light source, which are calculated from the result of measurement of the electric current value in the voltage for detection V_Sense by the ammeter 17. Therefore even in the case of capturing an image of the light source flickering at a predetermined duty ratio, the image can be captured such that the brightness of the light source becomes constant in the captured images.

Embodiment 3

An image pickup apparatus according to Embodiment 3 will be described next. In the following description, a configuration that is different from the image pickup apparatus according to Embodiment 1 will be the focus. Further, in the following description, a composing element the same as Embodiment 1 is denoted with the same reference sign, and detailed description thereof is omitted.

In the image pickup apparatus 1 according to Embodiment 1, an electric current measuring device is used to measure the electric current generated by electric charges, which are generated in a period other than the imaging capturing period when the user operates the image pickup apparatus 1. In the image pickup apparatus 1 according to Embodiment 3, on the other hand, the electric current is not measured, and the frequency and the duty ratio of the light source are detected.

Figure 13:
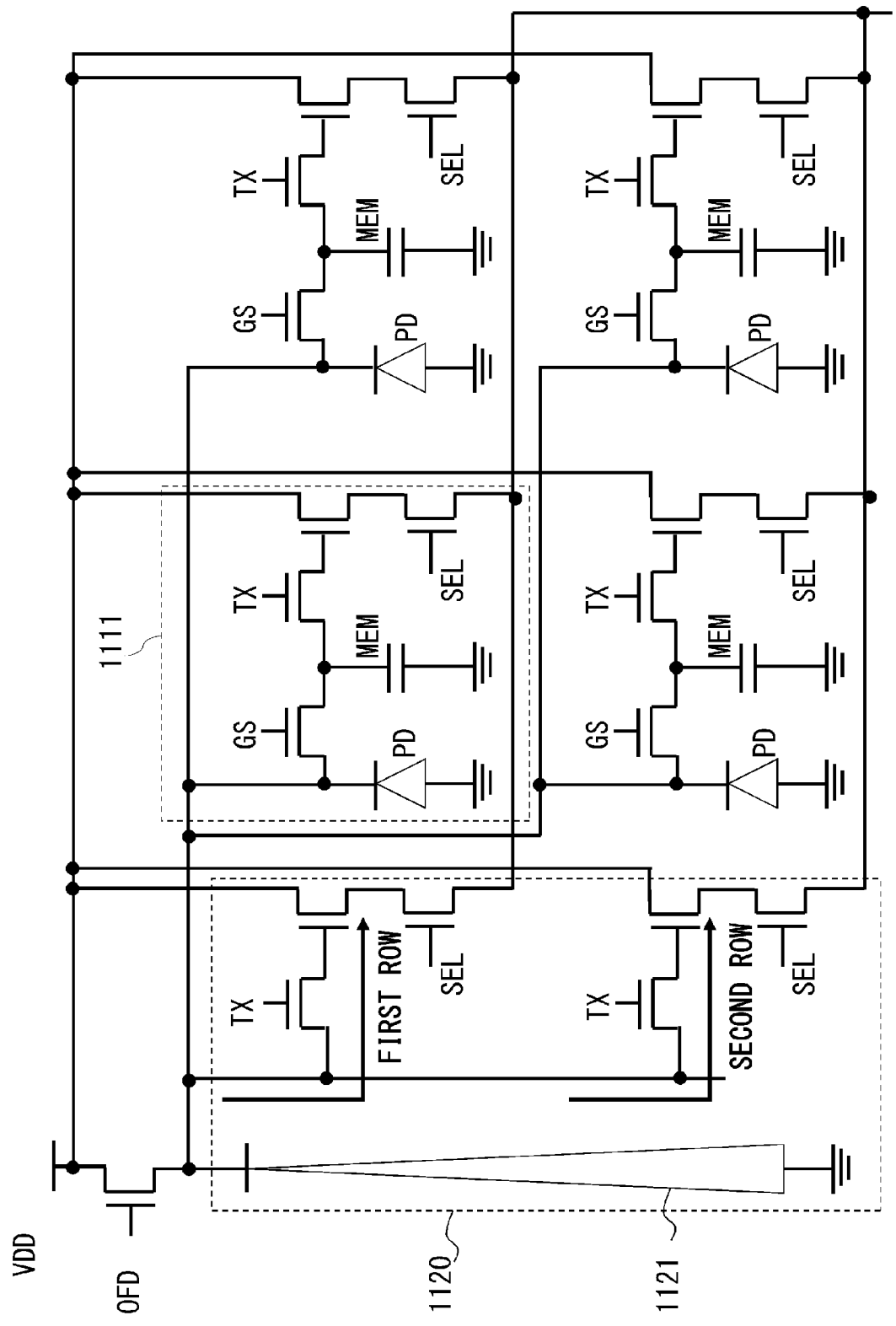
FIG. 13 is a diagram indicating an equivalent circuit of a pixel according to Embodiment 3.

FIG. 13 indicate an equivalent circuit of a pixel 1111 according to Embodiment 3. The image pickup apparatus 1 according to Embodiment 3 includes pixels for detection 1120 to detect a size corresponding to all the rows on the imaging surface, separately from the photoelectric conversion circuits PD used for imaging. Each pixel for detection 1120 includes a photoelectric conversion circuit 1121 (second photoelectric conversion circuit) which is disposed for all the rows on the imaging surface, and the pixel for detection 1120 is read at the beginning of each row, synchronizing with the reading of each row of the pixels 1111 for imaging.

FIG. 14 indicates a schematic diagram of an image in a case of imaging a flickering light source as an object using the pixels 1111 indicated in FIG. 13. In Embodiment 3, the frequency and the duty ratio of the light source with respect to the time for reading all the rows can be calculated based on the profile of the pixel value of the pixel for detection 1120 (column 1201 in FIG. 14), which is read during image capturing by the image pickup apparatus 1. By using the calculated frequency and the duty ratio, the transistor M2 or the memory transfer transistors M11 and M21 are moved so that the exposure period is controlled to overlap with the light-emitting period of the light source, and this driving is the same as Embodiment 1.

Embodiment 4

Figure 15:
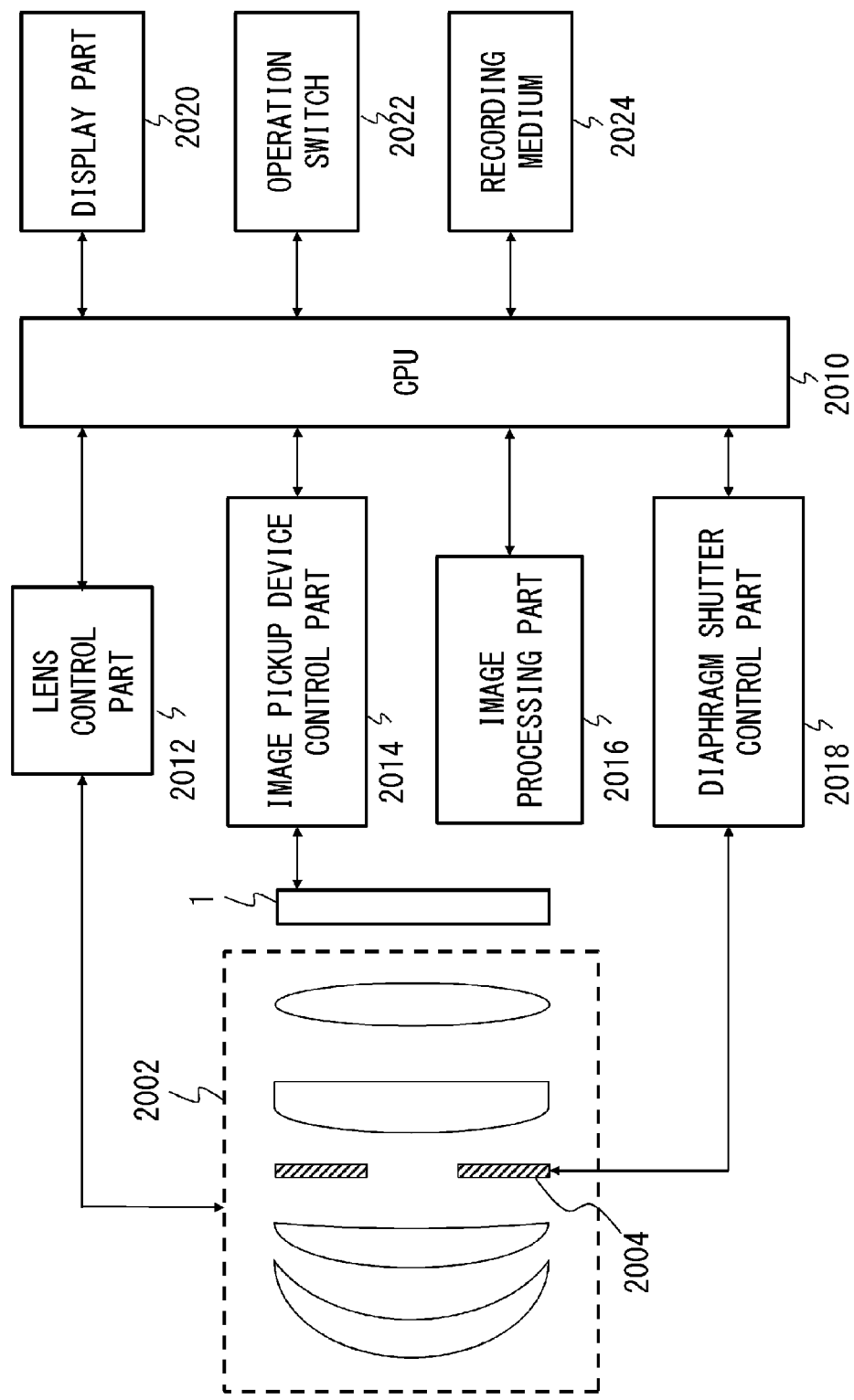
FIG. 15 is a block diagram of an imaging system according to Embodiment 4.

An imaging system in accordance with Embodiment 2 of the present invention will be described by reference to FIG. 15. FIG. 15 is a block view showing a schematic configuration of an imaging system in accordance with the present Embodiment.

The solid-state image pickup element (photoelectric conversion apparatus) described in Embodiments 1 to 3 is applicable to various imaging systems. The applicable imaging system has no particular restriction, and examples thereof may include various devices such as a digital still camera, a digital camcorder, a surveillance camera, a copier, a fax, a portable phone, an onboard camera, an observation satellite, and a medical camera. Further, a camera module including an optical system such as a lens and a solid-state image pickup element (photoelectric conversion apparatus) is also included in the imaging system. FIG. 15 shows a block view of a digital still camera as one example thereof.

An imaging system 2000 includes, as shown in FIG. 15, an image pickup apparatus 1, an image pickup optical system 2002, a CPU 2010, a lens control part 2012, an image pickup apparatus control part 2014, an image processing part 2016, and a diaphragm shutter control part 2018. The imaging system 2000 further includes a display part 2020, an operation switch 2022, and a recording medium 2024.

The image pickup optical system 2002 is an optical system for forming an optical image of an object, and includes a lens group, a diaphragm 2004, and the like. The diaphragm 2004 has a function of performing light amount adjustment by adjusting the aperture diameter, and additionally, also has a function as an exposure time adjusting shutter during photographing a still picture. The lens group and the diaphragm 2004 are held to be able to advance and retreat along the optical axis, and the linked operation thereof implements the scaling function (zooming function) and the focus adjusting function. The image pickup optical system 2002 may be integrated with the imaging system, or may be an image pickup lens mountable on the imaging system.

The image pickup apparatus 1 is positioned so that the image pickup surface is situated in the image space of the image pickup optical system 2002. The image pickup apparatus 1 is the solid-state image pickup element (photoelectric conversion apparatus) described in Embodiments 1 to 3, and includes a CMOS sensor (pixel part) and the peripheral circuit (peripheral circuit region) thereof. For the image pickup apparatus 1, pixels having a plurality of photoelectric converting parts are positioned two dimensionally, and color filters are positioned with respect to the pixels, thereby forming a two dimensional single plate color sensor. The image pickup apparatus 1 photoelectrically converts the object image formed by the image pickup optical system 2002, and outputs it as an image signal or a focus detection signal.

The lens control part 2012 is for controlling the advancing/retreating driving of the lens group of the image pickup optical system 2002, and performing a scaling operation and focus adjustment, and includes a circuit and a processing device configured so as to implement the functions. The diaphragm shutter control part 2018 is for changing the aperture diameter of the diaphragm 2004 (with the diaphragm value as variable), and adjusting the photographing light amount, and includes a circuit and a processing device configured so as to implement the functions.

The CPU 2010 is a control device in a camera for governing various controls of the camera main body, and includes an operation part, a ROM, a RAM, an A/D converter, a D/A converter, a communication interface circuit, and the like. The CPU 2010 controls the operation of each part in the camera according to the computer program stored in the ROM or the like, and executes a series of photographing operations such as AF, image pickup, image processing, and recording including the detection of the focus state (focus detection) of the image pickup optical system 2002. The CPU 2010 is also a signal processing part.

The image pickup apparatus control part 2014 is for controlling the operation of the image pickup apparatus 1, and A/D converting the signal outputted from the image pickup apparatus 1, and sending it to the CPU 2010, and includes a circuit and a control device configured so as to implement the functions. It does not matter if the A/D converting function is possessed by the image pickup apparatus 1. The image processing part 2016 is a processing device for performing image processing such as γ conversion or color interpolation on the A/D-converted signal, and generating an image signal, and includes a circuit and a control device configured so as to implement the functions. The display part 2020 is a display device such as a liquid crystal display device (LCD), and displays the information on the photographing mode of a camera, a preview image before photographing, a confirming image after photographing, the focused state upon focus detection, and the like. The operation switch 2022 includes a power supply switch, a release (shooting trigger) switch, a zooming operation switch, a shooting mode selecting switch, and the like. The recording medium 2024 is for recording the photographed image or the like, and may be the one included in the imaging system, or may be the detachable one such as a memory card.

The imaging system 2000 to which the solid-state image pickup element in accordance with Embodiments 1 to 3 is applied is configured in this manner. As a result, a high performance imaging system can be implemented.

Embodiment 5

Figure 16A:
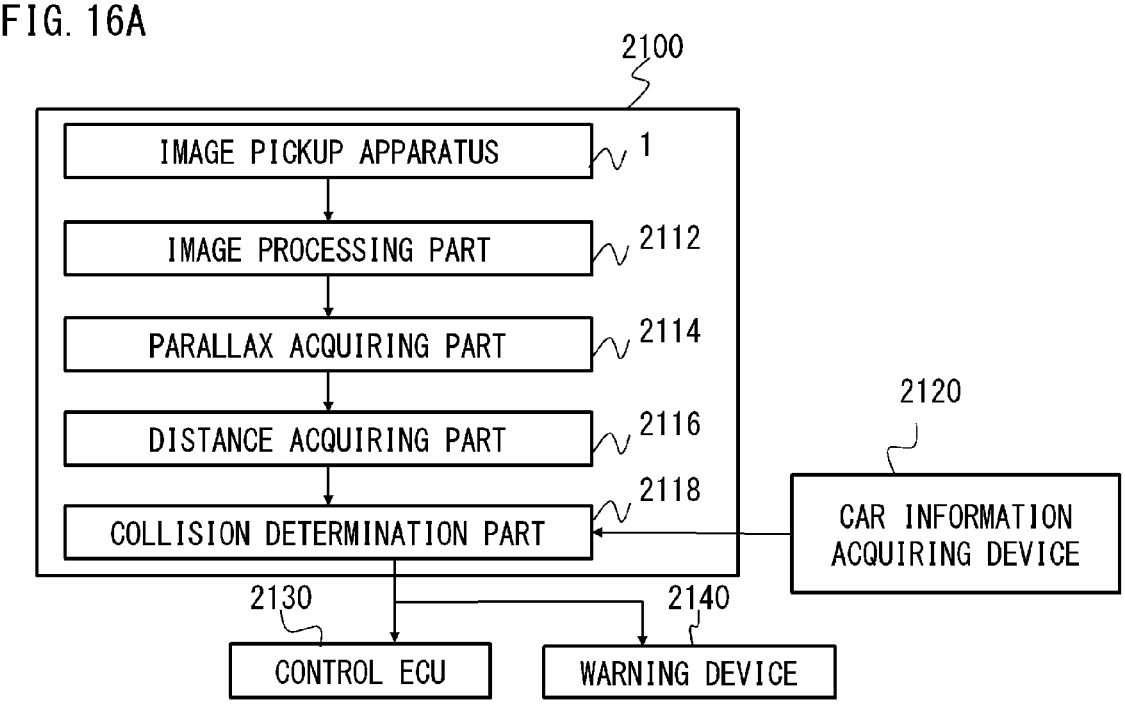
FIG. 16A and FIG. 16B are block diagrams of an imaging system and a mobile body according to Embodiment 5.
Figure 16B:
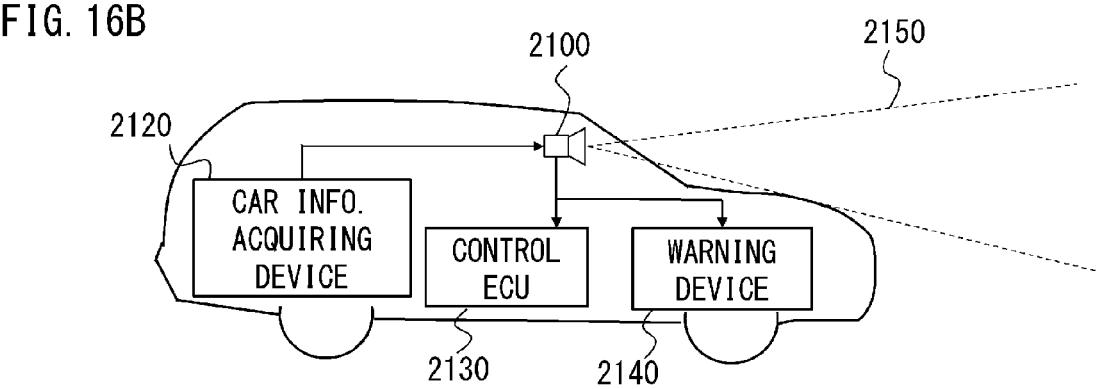

An imaging system and a mobile unit in accordance with Embodiment 5 of the present invention will be described by reference to FIGS. 16A and 16B. FIGS. 16A and 16B are views showing the configuration of the imaging system and the mobile unit in accordance with the present Embodiment.

FIG. 16A shows one example of an imaging system 2100 regarding an onboard camera. The imaging system 2100 has an image pickup apparatus 1. The image pickup apparatus 1 is any of the solid-state image pickup elements (photoelectric conversion apparatus) described in Embodiments 1 to 3. The imaging system 2100 has an image processing part 2112 and a parallax acquiring part 2114. The image processing part 2112 is a processing device for performing image processing on a plurality of image data acquired by the image pickup apparatus 1. The parallax acquiring part 2114 is a processing device for performing calculation of the parallax (phase contrast between parallax images) from the plurality of image data acquired by the image pickup apparatus 1. Further, the imaging system 2100 has a distance acquiring part 2116 which is a processing device for calculating the distance to the object based on the calculated parallax, and a collision determination part 2118 which is a processing device for determining whether there is a collision possibility or not based on the calculated distance. Herein, the parallax acquiring part 2114 or the distance acquiring part 2116 is one example of the information acquiring means for acquiring the information such as the distance information to the object. Namely, the distance information is the information regarding the parallax, the defocus amount, the distance to the object, or the like. A collision determination part 2118 may determine the collision possibility using any of the distance information. The processing devices may be implemented by an exclusively designed hardware, or may be implemented by a general-purpose hardware for performing operation based on a software module. Further, the processing device may be implemented by a FPGA (Field Programmable Gate Array), an ASIC (Application Specific Integrated Circuit), or the like, or may be implemented by the combination thereof.

The imaging system 2100 is connected to a car information acquiring device 2120, and can acquire car information such as the car speed, the yaw rate, or the steering angle. Further, to the imaging system 2100, a control ECU 2130 which is a control device for outputting a control signal for causing a car to generate a braking power based on the determination result of the collision determination part 2118. Namely, the control ECU 2130 is one example of the mobile unit control means for controlling the mobile unit based on the distance information. Further, the imaging system 2100 is also connected to a warning device 2140 for issuing a warning to a driver based on the determination results at the collision determination part 2118. For example, when the collision possibility is high as the determination result of the collision determination part 2118, the control ECU 2130 performs car control of applying brakes, releasing the accelerator, suppressing the engine output, or the like, thereby avoiding collision, and reducing the damage. The warning device 2140 sounds a warning such as a sound, displays warning information on a screen of a car navigation system, or the like, applies a vibration to a seat belt or a steering, and performs other operations, thereby giving a warning to a user.

In the present Embodiment, the periphery, for example, the front or the rear of the car is imaged by the imaging system 2100. FIG. 16B shows the imaging system 2100 when the car front (imaging region 2150) is imaged. The car information acquiring device 2120 sends instructions so as to operate the imaging system 2100 to execute image pickup. By using the solid-state image pickup element of Embodiments 1 to 3 as the image pickup apparatus 1, the imaging system 2100 of the present Embodiment can be more improved in precision of the distance measurement.

In the description up to this point, a description has been given to the example in which control is performed so as to prevent the collision with other cars. However, the present invention is applicable to the control of performing autonomous driving following another car, control of performing autonomous driving so as not to depart from the lane, and the like. Further, the imaging system is applicable to a mobile unit (transportation equipment) such as a ship, an aircraft, or an industrial robot not limited to a car such as an automobile. Mobile devices in the mobile unit (transportation equipment) are various driving sources such as an engine, a motor, a wheel, and a propeller. In addition, the present invention is applicable to, not limited to the mobile units, devices widely using object recognition such as the intelligent transport system (ITS).

OTHER EMBODIMENTS

The above mentioned embodiments are merely examples of the present disclosure. The scope of the present disclosure is not limited to the configurations of the above mentioned embodiments, but includes various embodiments without departing from the spirit of the disclosure.

According to the present invention, an object that flickers in an arbitrary cycle can be captured by an image pickup apparatus with uniform brightness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-152281, filed on Sep. 10, 2020, which is hereby incorporated by reference herein in its entirety.

What is claimed is:

1. An image pickup apparatus comprising:
   a plurality of pixels each of which includes a photoelectric conversion circuit configured to generate electric charges in accordance with incident light from an object;
   a measuring circuit configured to measure electric charges which are generated, in a period outside an exposure period of the photoelectric conversion circuit, in the photoelectric conversion circuit;
   a specifying circuit configured to specify a characteristic of a light source, based on a measurement result by the measuring circuit;
   an adjusting circuit configured to adjust the exposure period of the photoelectric conversion circuit, based on the characteristic specified by the specifying circuit; and
   an output circuit configured to output an image signal based on the electric charges generated in the photoelectric conversion circuit,
   wherein the measuring circuit is further configured to measure an electric current value of the electric charges generated in the photoelectric conversion circuit,
   wherein the specifying circuit is further configured to specify a frequency and a duty ratio of the light source, based on the electric current value measured by the measuring circuit,
   wherein the adjusting circuit is further configured to adjust a frequency and a duty ratio of the exposure period of the photoelectric conversion circuit, based on the specified frequency and duty ratio of the light source so that the exposure period overlaps with a light-emitting period of the light source, and
   wherein the measuring circuit comprises:
   (a) an OFD transistor connected to the photoelectric conversion circuit and configured to turn on in a period outside the exposure period; and
   (b) an ammeter connected to the OFD transistor and configured to detect a signal from the photoelectric conversion circuit via the OFD transistor.

2. The image pickup apparatus according to claim 1, wherein
   a plurality of sets of an electric charge holding circuit that holds electric charges generated in the photoelectric conversion circuit and a transistor that controls transfer of the electric charges, generated in the photoelectric conversion circuit, to the electric charge holding circuit are included for the photoelectric conversion circuit, and
   the adjusting circuit changes an operation timing of the transistor in each set of the plurality of sets, so as to alternately transfer, in frame units, the electric charges, generated in the photoelectric conversion circuit in each set, to the electric charge holding circuit.

3. The image pickup apparatus according to claim 2, wherein the adjusting circuit changes the operation timing of the transistor such that the transistor turns ON in a period from a point when reading of a reading target row of one frame for the plurality of pixels completes to a point when reading of a reading target row in the next frame starts.

4. The image pickup apparatus according to claim 1, wherein the plurality of pixels are pixels that are operated by a global shutter method.

5. An imaging system comprising:
the image pickup apparatus according to claim 1; and
a processor configured to process a signal outputted from the image pickup apparatus.

6. A mobile body comprising:
the image pickup apparatus according to claim 1;
a moving device;
a processor configured to acquire information from a signal outputted from the image pickup apparatus; and
a controller configured to control the moving device, based on the information.

7. A method of driving an image pickup apparatus, the image pickup apparatus including a plurality of pixels each of which includes a photoelectric conversion circuit that generates electric charges in accordance with incident light from an object, the method comprising:
measuring electric charges which are generated, in a period outside an exposure period of the photoelectric conversion circuit, in the photoelectric conversion circuit;

specifying a characteristic of a light source, based on a measurement result in the measuring;

adjusting the exposure period of the photoelectric conversion circuit, based on the characteristic by the specifying; and outputting an image signal based on the electric charges generated in the photoelectric conversion circuit, wherein the measuring measures an electric current value of the electric charges generated in the photoelectric conversion circuit, wherein the specifying specifies a frequency and a duty ratio of the light source, based on the electric current value measured in the step of measuring, wherein the adjusting adjusts a frequency and a duty ratio of the exposure period of the photoelectric conversion circuit, based on the specified frequency and duty ratio of the light source so that the exposure period overlaps with a light-emitting period of the light source, and wherein the measuring measures, by an ammeter connected to an OFD transistor, the electric charges which are generated in a period outside an exposure period of the photoelectric conversion circuit in the photoelectric conversion circuit, the OFD transistor being connected to the photoelectric conversion circuit and being configured to turn on in a period outside the exposure period.

* * * * *